United States Patent [19]

Yoshida et al.

[11] Patent Number: 4,791,344

[45] Date of Patent: Dec. 13, 1988

[54] MOTOR CONTROL APPARATUS FOR A SEWING MACHINE

[75] Inventors: Shinji Yoshida; Toshiaki Yanagi, both of Nagoya, Japan

[73] Assignee: Brother Kogyo Kabushiki Kaisha, Aichi, Japan

[21] Appl. No.: 68,209

[22] Filed: Jun. 30, 1987

[30] Foreign Application Priority Data

Jul. 3, 1986 [JP] Japan .................. 61-156759

[51] Int. Cl.$^4$ .................................. G05B 19/10
[52] U.S. Cl. .................................. 318/567; 318/369; 112/275; 112/221
[58] Field of Search ............... 318/567, 369, 761, 309, 318/310, 269, 270, 257, 567, 569, 364, 369; 112/257, 277, 275, 271, 274, 67, 87, 220, 221

[56] References Cited

U.S. PATENT DOCUMENTS

| | | | |
|---|---|---|---|
| 3,906,315 | 9/1975 | Gotisar | 318/761 |
| 3,910,211 | 10/1975 | Kubokura | 112/219 |
| 4,137,860 | 2/1979 | Yoneji et al. | 112/277 |
| 4,516,514 | 5/1985 | Neki et al. | 112/275 |
| 4,517,909 | 5/1985 | Neki et al. | 112/275 |
| 4,627,370 | 12/1986 | Nakamura | 112/275 |
| 4,676,180 | 6/1987 | Neki et al. | 112/277 |
| 4,714,039 | 12/1987 | Shimada | 112/275 |

FOREIGN PATENT DOCUMENTS 0176599 9/1986 European Pat. Off. .

Primary Examiner—William M. Shoop, Jr.
Assistant Examiner—Brian K. Young
Attorney, Agent, or Firm—Parkhurst, Oliff & Berridge

[57] ABSTRACT

A motor control apparatus for a sewing machine comprising a stop device for generating a stop signal instructing stoppage of an alternating current motor, a sensor for sensing a predetermined position of a needle and outputting a position signal thereof, and a stop control responsive to the stop device and the sensor means for controlling a rotating field of an alternating current motor to stop in response to the stop position of the needle when the stop signal and the position signal are received.

9 Claims, 7 Drawing Sheets

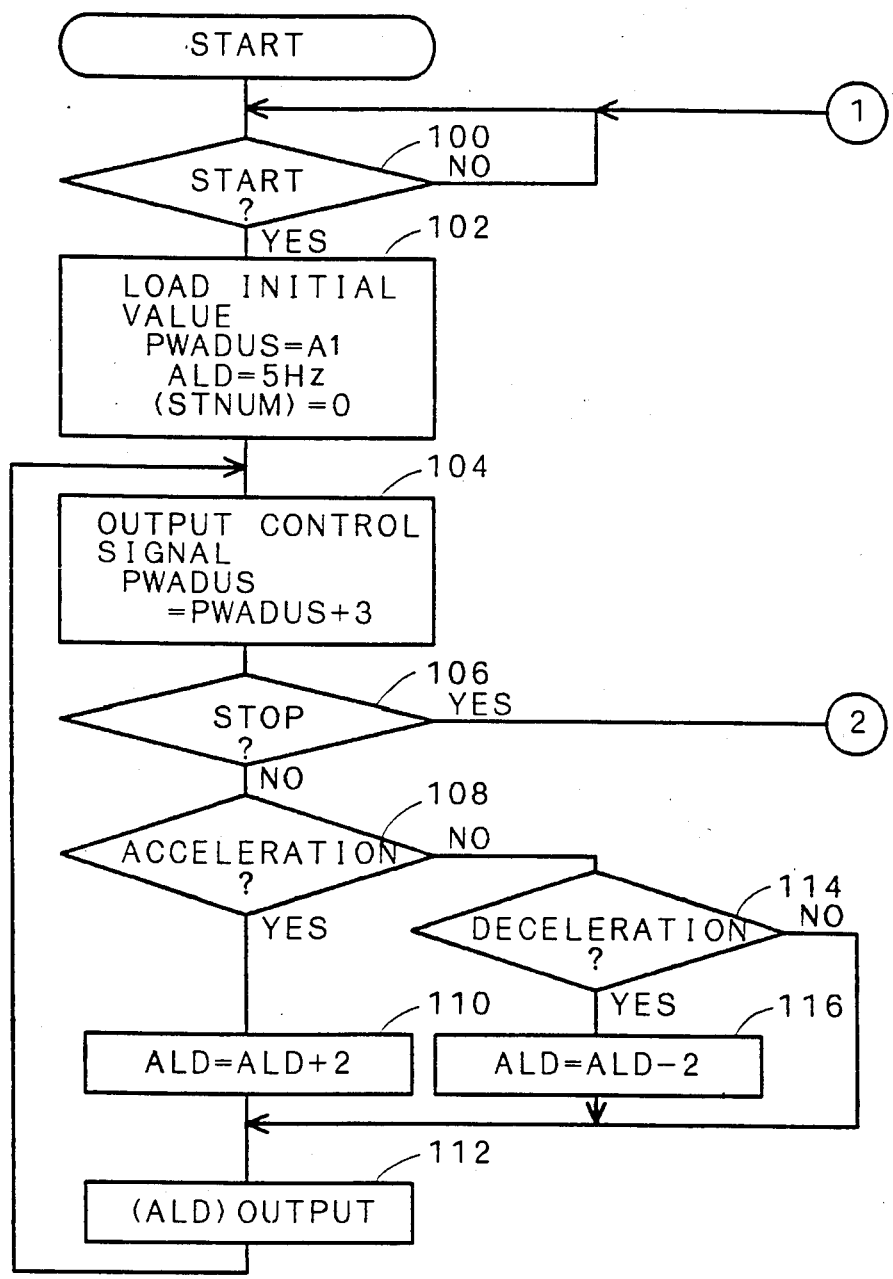

FIG. 6

| PWADUS | T1 | T2 | T3 |
|---|---|---|---|
| $A_1$ | $t_1 + t_2$ | $t_1$ | 0 |
| $A_2$ | $t_3 + t_4$ | $t_3$ | 0 |
| ⋮ | ⋮ | ⋮ | ⋮ |
| $A_i$ | 0 | $t_i$ | $t_i + t_{i+1}$ |
| ⋮ | ⋮ | ⋮ | ⋮ |
| $A_n$ | $t_j$ | 0 | $t_j + t_{j+1}$ |

FIG. 7

| ALD | F |
|---|---|
| 5.0 Hz | F 50 |
| 5.1 Hz | F 51 |
| 5.2 Hz | F 52 |
| ⋮ | ⋮ |
| 59.9 Hz | F 599 |
| 60.0 Hz | F 600(=0) |

MOTOR CONTROL APPARATUS FOR A SEWING MACHINE

BACKGROUND OF THE INVENTION

1. Field of the Invention

The present invention relates to a motor control apparatus for a sewing machine, more particularly to the motor control apparatus for stopping a needle of the sewing machine by using an inverter.

2. Prior Art

Motors for controlling a needle of a sewing machine, such as direct current servo motors and clutch motors have been widely used. Maintenance is necessary for the direct current servo motor disclosed in the U.S. Pat. No. 4,137,860 since it has a brush. A clutch motor disclosed in the U.S. Pat. No. 3,910,211 needs a brake mechanism and needs to activate the motor while stopping the needle so that power loss and poor durability derive therefrom. Recently, there has been proposed a control apparatus disclosed in U.S. Pat. No. 4,627,370 for controlling a speed of an induction motor by an inverter.

In this inverter, the motor is decelerated in accordance with regenerative braking, direct current braking or negative-phase braking, and so on. Control of the stop position of the needle, however, is done by a mechanical electromagnetic brake so as to stop the needle at the predetermined position in upward and downward direction. Accordingly, the electromagnetic brake should be incorporated into the motor, which enlarges the motor. Also the drive circuit of the electromagnetic brake as well as the inverter circuit is needed, adding to apparatus's high cost.

Furthermore, a synchronous motor disclosed in EPC Appln. No. 176599 using the inverter as motor controller of the sewing machine has been proposed and developed. In this motor, however, a permanent magnet is generally attached to a rotor and there is a need to provide a detector for detecting a rotational position of a rotor so as to change the energization of stator coils. Accordingly, the motor configuration gets complicated, adding to high cost.

SUMMARY OF THE INVENTION

A first object of the present invention is to stop a needle of a sewing machine by using an inverter.

A second object of the present invention is to simplify the stop control of the needle of the sewing machine without using a mechanical braking device.

A third object of the present invention is to make an inexpensive braking mechanism of small size.

In accordance with the present invention, a motor control apparatus for a sewing machine comprising; an inverter circuit for providing an alternating power to stator coils of an alternating current motor with variable frequency and for generating a rotating field therein; a detector for detecting a predetermined position of a needle and outputting a position signal thereof; an inverter controller for generating an activation signal to control the rotating field and activating the inverter circuit in response thereto; command means for generating a stop signal to stop said alternating current motor; and stop control means for maintaining the energizing state of said stator coils corresponding to said position signal to stop said needle after the issuance of said stop signal. According to the invention the activation signal is generated in accordance with a substantially sine pulse width modulation. The energizing state when the position signal is inputted is maintained in response to the position signal. In other words, the cycle for stator coil activation is continued. The rectangular PWM or multiple PAM may be applied.

In view of the above, the inverter circuit is activated by the inverter control apparatus according to a predetermined sequence, thereby generating the variable rotating field in the alternate current motor and rotating the motor in synchronism or slippage therewith. The direction of the rotating field is controlled by the activation signal from the inverter control apparatus. The needle moves up and down in accordance with the direction of the motor's rotation. After the stop signal that controls the rotation and the position signal are received, the stop control of the needle is executed in which the rotating field is controlled to stop at a predetermined position. The alternate current motor is thus stopped at the predetermined position. Also the braking force during stop control is adjusted by the magnitude of the rotating field.

BRIEF DESCRIPTION OF THE DRAWINGS

The present invention will be described in more detail with examples and reference to the accompanying drawings, in which:

FIGS. 5A and 5B are flowcharts showing processing steps by a MPU.

FIG. 6 is a table storing data for activation control.

FIG. 7 is a table storing data for frequency control.

DETAILED DESCRIPTION OF THE PREFERRED EMBODIMENT

One embodiment of the present invention will be hereinafter described in accordance with FIGS. 1 through 8.

Figure 1:
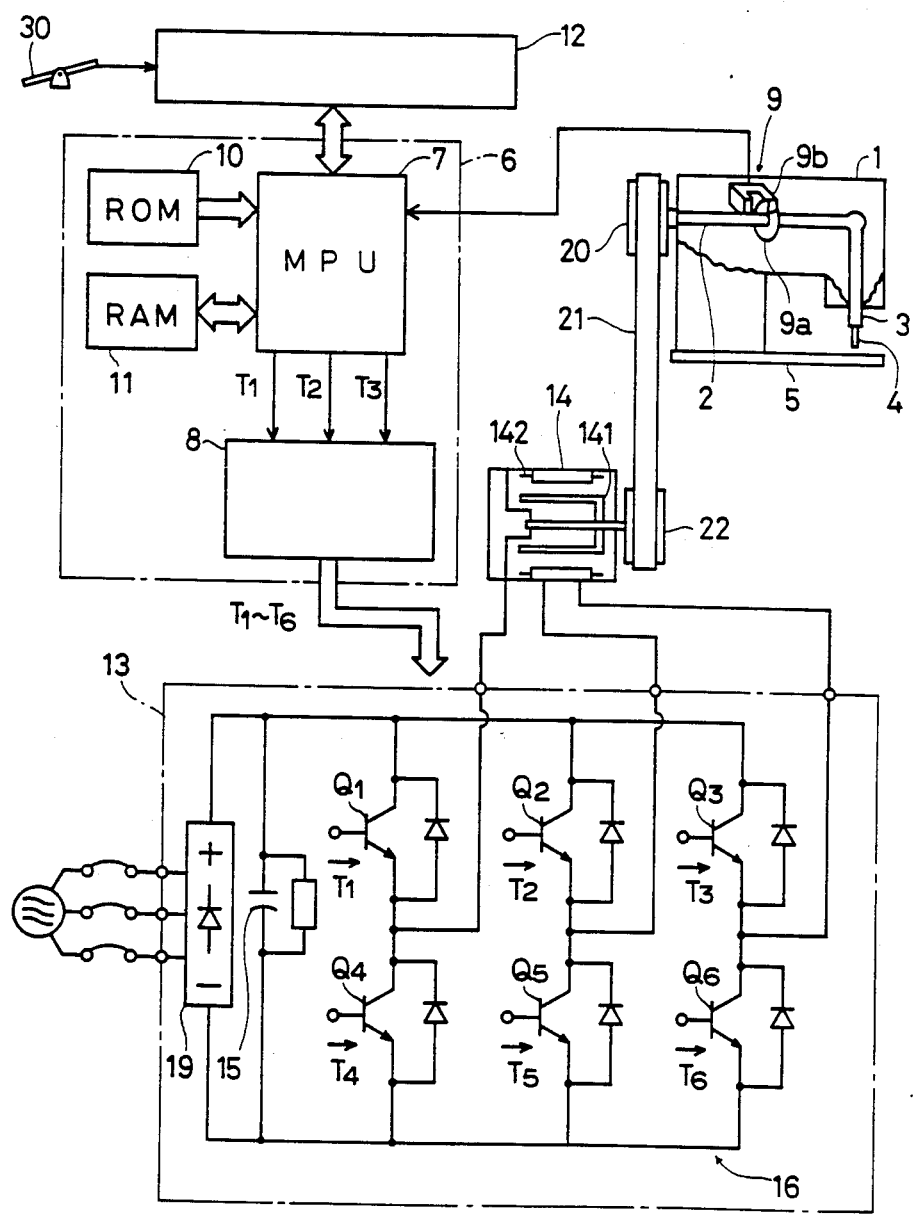
FIG. 1 is a diagram showing a general construction of a present embodiment according to a present invention.

FIG. 1 shows an entire construction of a sewing machine provided with a control apparatus in the embodiment of the present invention. The numeral 1 designates a sewing machine 1 which is provided with a main shaft 2 therein. The main shaft 2 is used to provide the up-down movement of a needle bar 3 provided with a needle 4. The needle 4 moves upward and downward relative to a table 5 through a needle plate in accordance with rotation of main shaft 2 so that a fabric is sewn. The main shaft 2 is provided with a position sensor 9 for detecting the needle's position. The position sensor 9 comprises a sectorial shielding plate 9a provided at the main shaft 2 and having a partial notch, and a photo-interrupter 9b. The photo passes through the notch so that the rotational position of the main shaft 2 is detected. The position sensor 9 detects when the needle 4 has reached a predetermined upper (relative to the fabric) position by the position of the notch. The signal detected by the position sensor 9 is outputted to a control apparatus 6. The main shaft 2 is rotated by an induction motor 14 via the pulleys 20 and 22 and a belt 21. The induction motor 14 includes a rotor 141 and a stator coil 142 energized by an inverter circuit 13, of which transistors are activated by a drive circuit 8. The drive circuit 8 connects to a microprocessor unit 7 (hereinafter referred to MPU) and outputs a control signal for each transistor of the inverter circuit 13 in response to the control signal from the MPU 7. The MPU 7 includes a ROM 10 storing an activation control program and a control table, and connects to a sewing controller 12 outputting a command signal with respect to the rotation of the induction motor 14 according to the sewing data. The sewing controller 12 outputs a start command signal in response to depression of a pedal 30 and a stop command signal in response to a release thereof.

The inverter circuit 13 includes a smoothing capacitor 15, a power inverting part 16 and a three-phase full wave rectification circuit 19. The power inverting part 16 is constructed such that sic transistors are interconnected in a three-phase bridge.

The present embodiment is the motor controller for the sewing machine which sews automatically according to the sewing data. The activation control is made in accordance with the sine pulse width modulation outputted by the MPU 7. The transistors Q1 through Q6 which compose the power inverting part 16 are divided into three groups (Q1,Q4), (Q2,Q5) and (Q3,Q6). Two transistors in each set are not simultaneously in the ON and OFF conditions, but alternately so, except during the dead period in which the micro-OFF condition is executed simultaneously to avoid destruction of elements caused by short-circuiting during ON-OFF switching. The activation signals (T1,T2,T3) for the transistors (Q1,Q2,Q3) are sent to the drive circuit 8 from the MPU 7. The activation signals (T4,T5,T6) are sent to the inverter circuit 13 from the drive circuit 8.

Figure 2:
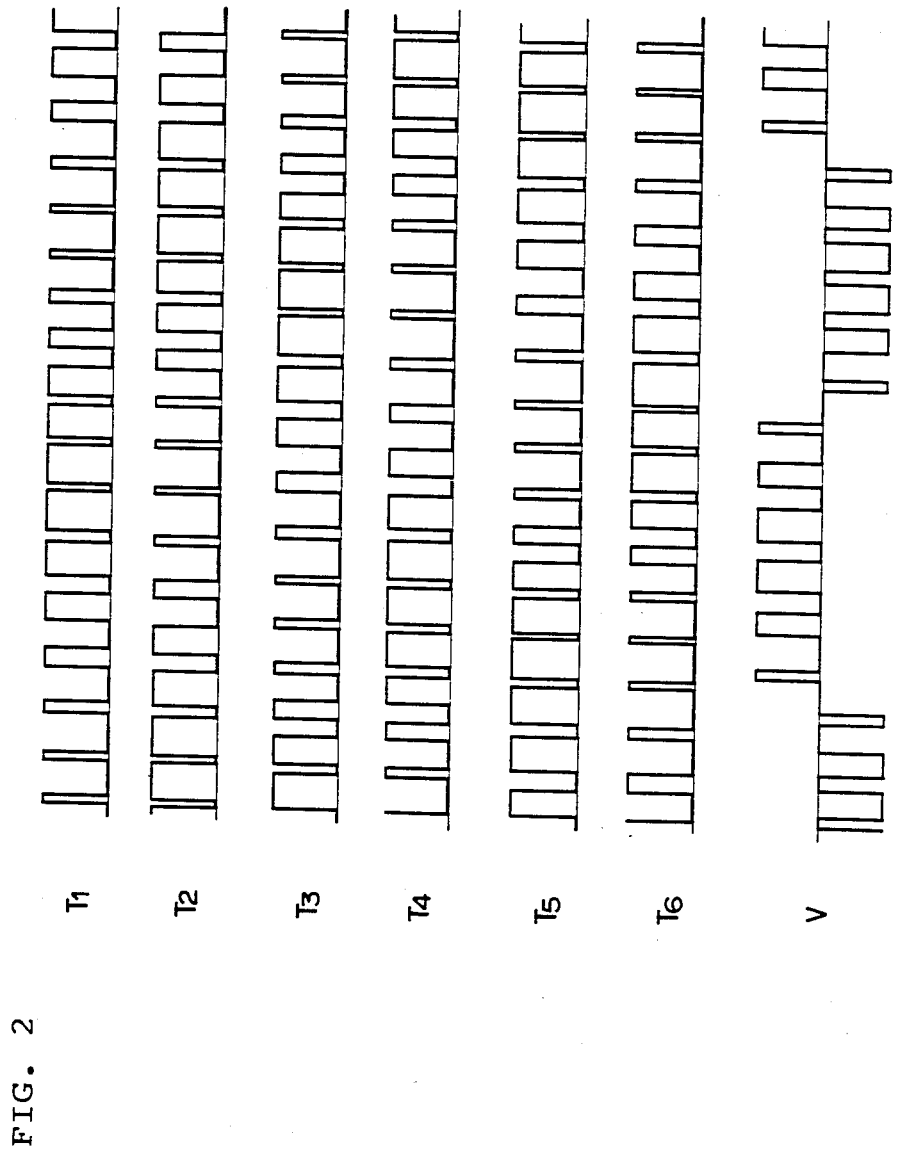
FIG. 2 is a timechart of an activation signal by a sine pulse width modulation.
Figure 3:
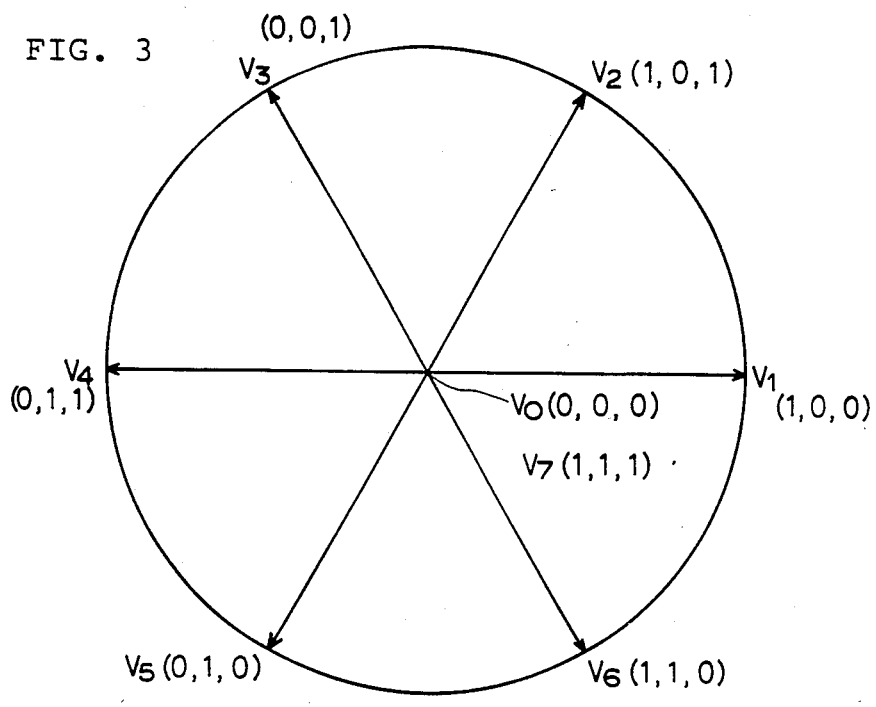
FIG. 3 is a vectorchart of the activation signal.

The substantially sine pulse width modulation divides one cycle of three-phase sine wave and modulates the amplitude at each divided point into a pulse width. FIG. 2 shows the activation signals (T1–T6), and the line voltage V applied to the induction motor 14, each representing a three-phase PWM signal. FIG. 3 shows a vectorchart in which the activation signal (T1,T2,T3) represent three-phase voltage, when each signal is set to "1" at high voltage level and to "0" at low voltage level. There are eight conditions for three-phase voltage such as V0(0,0,0), V1(1,0,0), V2(1,0,1), V3(0,0,1), V4(0,1,1), V5(0,1,0), V6(1,1,0) and V7(1,1,1).

Figure 4:
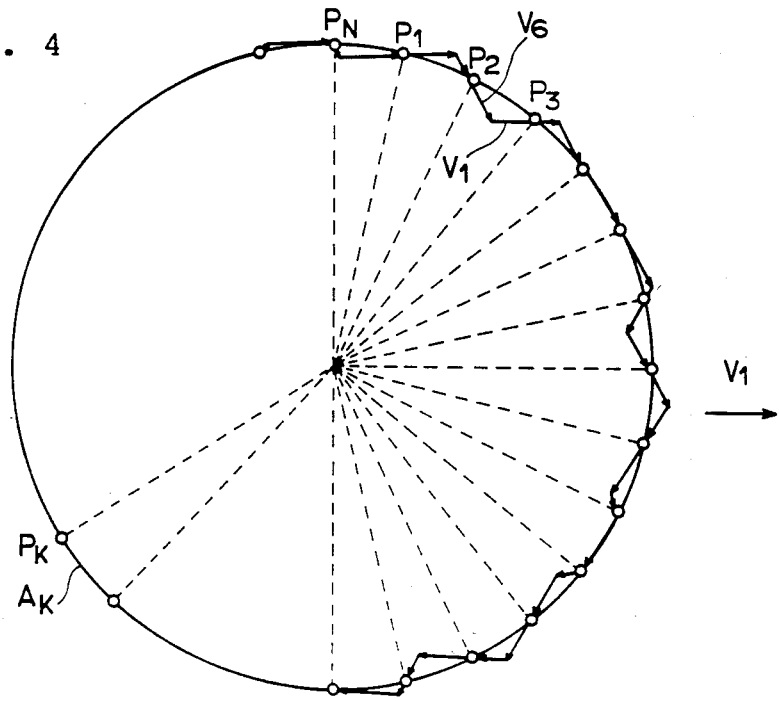
FIG. 4 is a vectorchart showing a relationship between a rotating field and an activation condition.

Voltage conditions V0 and V7 represent the case when no power is supplied to the motor. V0 can be used alternatively. The three-phase PWM signals can be obtained by sequentially changing these voltage conditions, using a continuous period thereof as a parameter. The three-phase PWM signals obtained at the aforementioned N-divided cycle (hereinafter referred to activation control period interval) is represented by V0, the other two continuous voltage conditions and the continuous period thereof. Upon driving the induction motor 14 in accordance with the PWM signals, the rotating field is generated as shown in FIG. 4. Upon completion of each process at one activation period, the rotating field is positioned at the N-divided positions. P1–PN on the circle. The voltage condition V0 at each interval can be lengthened thereby reducing the rotational speed of the motor and the average voltage. The speed control is thus executed to maintain V/f constant.

Figure 8:
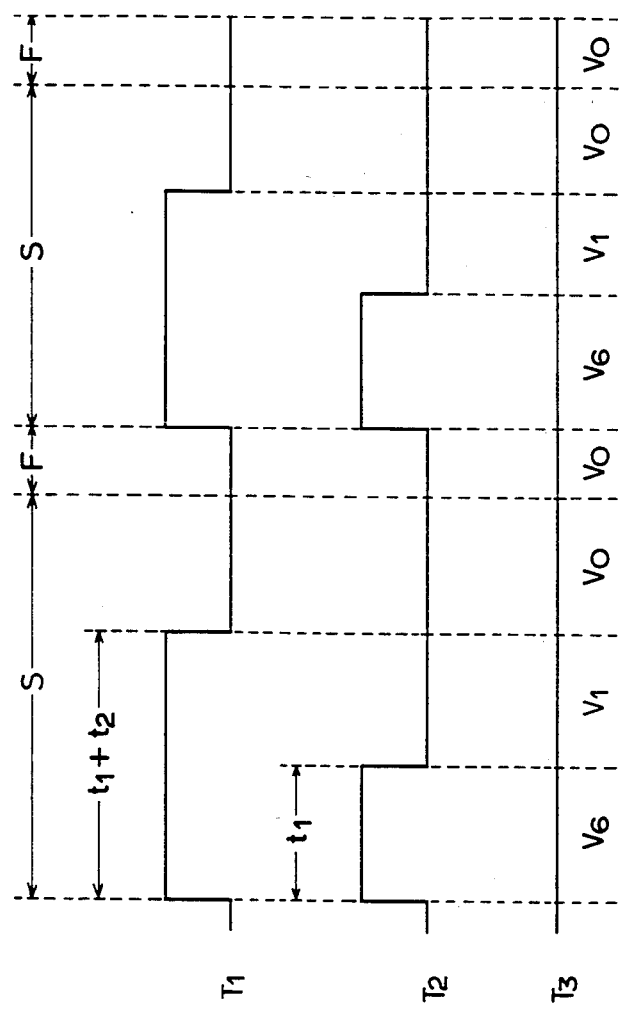
FIG. 8 is a timechart for the activation signal.

As shown in FIG. 6, the activation control signal is stored so that each phase of the signal (T1,T2,T3) remains at high level for the predetermined period according to each N-divided activation period. When the maximum frequency is 60 Hz, an integrated time S of each activation period is assigned to 1/60 Nsec. At each period, for example at the activation period A1, the ON-condition continuous period of each phase is set such that T1>T2>T3. As shown in FIG. 8, the signal (1,1,0) is outputted for t1sec, signal (1,0,0) is outputted for t2sec, and then the signal (0,0,0) is outputted for S−(t1+t2)sec. After that, the frequency control data F shown in FIG. 7 is read in accordance with the speed command and the signal (0,0,0) is continuously outputted for a period F sec. Next, the subsequent process for activation at the next activation period is executed. The rotating field is thus positioned from PN to P1 and is sequentially positioned at P1 through PN.

Figure 5B:
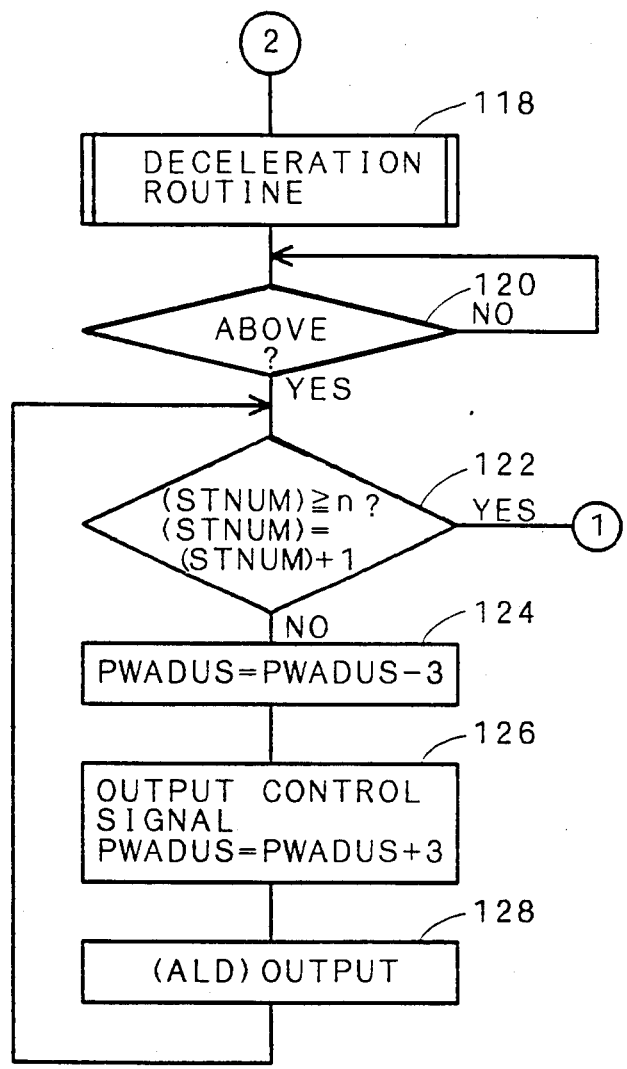

Referring to FIG. 5, a process from start to stop with respect to the sewing machine is hereinafter described. First, a start command signal of the induction motor is inputted from the sewing controller 12 at step 100. Various parameters for activation are set at step 102. Specifically, an address pointer PWADUS for activation signal is set equal to the head address of a table representing an activation control data, and an address pointer ALD for frequency control is set equal to an address storing a minimum frequency control data, and the STNUM is set equal to 0. In accordance with the above-mentioned sequence, the activation signal is issued in accordance with the above table and the induction motor 14 starts rotating. At the subsequent step 104, the activation signal is outputted and PWADUS is set equal to the previously stored PWADUS plus 3. Upon receipt of the command signal for acceleration, the address pointer ALD for frequency control is updated toward high frequency in steps 108–112. The activation signal (0,0,0) is outputted during the activation period in accordance with the period of the control data so as to adjust the frequency. Conversely, in case of a deceleration command, the address pointer ALD is updated toward low frequency through steps 108–116. Since these processing loops are repeatedly executed, the induction motor 14 is controlled to operate at a constant or variable speed in response to a speed change signal after it has accelerated to the predetermined speed.

Upon receipt of the stop command signal at step 106, the speed of the motor is decelerated until the speed drops to a predetermined speed level at speed 118. The program proceeds to step 120 where it is determined whether or not the needle 4 has reached at a predetermined position above the fabric. If the determination is YES at step 120, the program proceeds to step 122 where it is determined whether or not a stoppage period STNUM is a predetermined period n or more. The period n is longer than the period F. If the determination is YES, the program returns to step 100. If the determination is NO, the program proceeds to step 124 where PWADUS is set equal to the previously stored PWADUS minus 3. At step 126, the activation signal is issued and PWADUS is set equal to the previously stored PWADUS plus 3. PWADUS set at step 126 indicates an address where the next data in the period is stored in such a manner that the rotating field is positioned at Pk if the activation period is Ak when the position signal is generated. At step 126, the motor 14 is activated at the period Ak. At the subsequent step 128, the frequency signal according to the frequency control data is issued and the program returns to step 122. The program loop of steps 122 through 128 is repeatedly executed. Accordingly, the activation period is fixed at Ak and the rotating field at the position Pk. The magnitude of the rotating field is varied in response to the continuous period of the activation signal (0,0,0) determined at step 128. The rotating field is thus controlled to be stoppage thereby braking the rotor of the induction motor 14 and stopping the needle 4 at the predetermined position. After the predetermined period has elapsed since the needle stopped, the program proceeds to step 100 and the next processing steps are then executed.

This invention, not being limited to the induction motor, may be applied to the synchronous motor or the like. The stop command signal may be automatically issued by the sewing controller instead the pedal's releasing.

While the preferred embodiment of the present invention has been described, it is to be understood that the inventions not limited thereto, and may be otherwise embodied within the scope of the following claims.

What is claimed is:

1. A motor control apparatus for a sewing machine comprising:
    an induction motor having a stator coil and a rotor for moving a needle in upward and downward direction;
    an inverter circuit for energizing said stator coil;
    an inverter controller for controlling an activation of said inverter circuit and for generating a rotating magnetic field in said induction motor;
    a command means for outputting a start command and a stop command of said induction motor to said inverter controller;
    a detector for detecting a predetermined position of a needle and outputting a position signal thereof to said inverter controller; and
    wherein said inverter controller includes;
    memory means for storing a predetermined set of activation control data representing voltage vectors relative to the rotating magnetic field and an activation time period relating to said voltage vectors;
    activation control means responsive to the start command for sequentially reading said set of activation control data from said memory means at an interval of a first predetermined period and for sequentially generating the rotating magnetic field within said induction motor in response to said set of activation control data read from the memory means to move said needle in upward and downward direction; and
    stop control means for maintaining the direction of the rotating magnetic field in an energizing state of said stator coil during a second predetermined period, utilizing the activation control data corresponding to the position signal received after issuance of said stop command from the command means.

2. The motor control apparatus for the sewing machine according to claim 1, wherein said second predetermined period is longer than said first predetermined period.

3. The motor control apparatus for the sewing machine according to claim 1, wherein said inverter controller includes a decelerating means responsive to said stop signal of said command means for decelerating a rotor speed and said stop control means becomes effective after the deceleration done by said decelerating means.

4. The motor control apparatus for the sewing machine according to claim 3, wherein said decelerating means increases said first predetermined period thereby decelerating the rotor speed.

5. The motor control apparatus for the sewing machine according to claim 1, wherein the start signal and the stop signal of said command signal include an accelerating command and a decelerating command, and said activation control means decreases said first predetermined period in response to the accelerating command and increases said first predetermined period in response to the decelerating command.

6. The motor control apparatus for the sewing machine according to claim 1, wherein said command means stores sewing data including an accelerating command and a decelerating command and outputs said commands in accordance with sewing progress.

7. The motor control apparatus for the sewing machine according to claim 1, wherein the activation of said inverter circuit is executed in accordance with a substantial sine pulse width modulation.

8. The motor control apparatus for the sewing machine according to claim 1, wherein said set of activation control data are represented by three voltage vectors: one being a non-braking vector which does not effect braking of said induction motor; and the others being braking vectors which effect braking of said induction motor.

9. The motor control apparatus for the sewing machine according to claim 1, wherein said set of activation control data is selected from a group comprising two non-braking vectors and six braking vectors.

* * * * *